(12) United States Patent
Ponson et al.

(10) Patent No.: US 7,766,140 B2
(45) Date of Patent: Aug. 3, 2010

(54) FREEWHEEL BEARING DEVICE WITH TORQUE LIMITER

(75) Inventors: Frédéric Ponson, Luynes (FR); Thierry Poulle, Neuvy le Roi (FR); Virginie Hamada, Tours (FR); Romuald Lescorail, Tours (FR); Claude Caillault, Tours (FR)

(73) Assignee: SKF France, Montigny le Bretonneux (FR)

( * ) Notice: Subject to any disclaimer, the term of this patent is extended or adjusted under 35 U.S.C. 154(b) by 881 days.

(21) Appl. No.: 10/566,669

(22) PCT Filed: Jun. 25, 2004

(86) PCT No.: PCT/FR2004/001609

§ 371 (c)(1), (2), (4) Date: Oct. 23, 2006

(87) PCT Pub. No.: WO2005/021991

PCT Pub. Date: Mar. 10, 2005

(65) Prior Publication Data

US 2007/0074945 A1 Apr. 5, 2007

(30) Foreign Application Priority Data

Jul. 28, 2003 (FR) .................................. 03 09239

(51) Int. Cl.
*F16D 15/00* (2006.01)
(52) U.S. Cl. .................. 192/45.1; 192/41 S; 192/55.1; 192/110 B
(58) Field of Classification Search ................ 192/45.1, 192/41.5, 55.1, 56.2, 56.1, 56.6, 110 B; 464/40, 464/46, 30
See application file for complete search history.

(56) References Cited

U.S. PATENT DOCUMENTS 3,926,286 A * 12/1975 Johnson .................... 192/41 S (Continued)

FOREIGN PATENT DOCUMENTS

DE    3534462    4/1987

(Continued)

OTHER PUBLICATIONS

U.S. Appl. No. 10/548,866 entitled "Sensor Unit, and Housing Relay for the Production of Said Unit" to Landrieve. Available in Private PAIR.
U.S. Appl. No. 10/552,375 entitled "Freewheel Bearing Device and Freewheel Pulley" to Girardin. Available in Private PAIR.

(Continued)

*Primary Examiner*—Rodney H Bonck
*Assistant Examiner*—Justin Holmes
(74) *Attorney, Agent, or Firm*—Meyertons, Hood, Kivlin, Kowert & Goetzel, P.C.; Eric B. Meyertons

(57) ABSTRACT

The invention concerns a freewheel bearing device including an outer element and inner element arranged inside the outer element, and a free wheel provided with at least a wedging element, arranged between the inner element and the outer element to allow a free rotational movement in one direction between the outer element and the inner element and for transmission of a torque in the other direction between the outer element and the inner element, the free wheel including a ring provided with a cylindrical inner surface and a cylindrical outer surface, substantially aligned on a radial plane perpendicular to the axis of rotation of the device, and a torque limiting member adapted to limit the torque transmitted by the free wheel, the torque limiting member being arranged radially between said ring and the outer element or the inner element in contact with said ring and said element.

16 Claims, 7 Drawing Sheets

U.S. PATENT DOCUMENTS

| | | | |
|---|---|---|---|
| 4,029,186 A | 6/1977 | De Gennes | |
| 4,046,238 A | 9/1977 | Mendoza-Orozco | |
| 4,319,220 A | 3/1982 | Pappas et al. | |
| 4,478,595 A | 10/1984 | Hayakawa et al. | |
| 4,601,374 A | 7/1986 | Ladin | |
| 4,608,741 A | 9/1986 | Mallet | |
| 4,641,523 A | 2/1987 | Andreasson | |
| 4,699,530 A | 10/1987 | Satoh et al. | |
| 4,815,867 A | 3/1989 | Ladin | |
| 4,854,436 A | 8/1989 | Lassiaz et al. | |
| 4,872,768 A | 10/1989 | Brandenstein et al. | |
| 4,874,073 A | 10/1989 | Tagawa | |
| 4,881,629 A | 11/1989 | Gay et al. | |
| 4,946,295 A | 8/1990 | Hajzler | |
| 4,957,133 A | 9/1990 | Linz et al. | |
| 5,008,647 A | 4/1991 | Brunt et al. | |
| 5,018,384 A | 5/1991 | Hayashi et al. | |
| 5,033,013 A | 7/1991 | Kato et al. | |
| 5,072,181 A | 12/1991 | Burger | |
| 5,264,790 A | 11/1993 | Moretti et al. | |
| 5,372,435 A | 12/1994 | Genero et al. | |
| 5,575,568 A | 11/1996 | Rigaux et al. | |
| 5,592,401 A | 1/1997 | Kramer | |
| 5,598,913 A | 2/1997 | Monahan et al. | |
| 5,711,405 A * | 1/1998 | Tamehira | 192/26 |
| 5,713,577 A | 2/1998 | Lannert et al. | |
| 5,721,539 A | 2/1998 | Goetzl | |
| 5,780,731 A | 7/1998 | Matsui et al. | |
| 5,845,230 A | 12/1998 | Lamberson | |
| 5,865,288 A | 2/1999 | Thomire et al. | |
| 5,877,431 A | 3/1999 | Hirano | |
| 6,011,491 A | 1/2000 | Goetzl | |
| 6,013,007 A | 1/2000 | Root et al. | |
| 6,035,990 A | 3/2000 | Peschke | |
| 6,043,643 A | 3/2000 | Message et al. | |
| 6,056,446 A | 5/2000 | Welter et al. | |
| 6,109,624 A | 8/2000 | Message et al. | |
| 6,160,480 A | 12/2000 | Su-yueh | |
| 6,196,552 B1 | 3/2001 | Peterson et al. | |
| 6,267,512 B1 | 7/2001 | Beghini et al. | |
| 6,304,079 B1 | 10/2001 | Kenjo et al. | |
| 6,323,640 B1 | 11/2001 | Forestiero et al. | |
| 6,338,576 B1 | 1/2002 | Girardin et al. | |
| 6,415,900 B1 | 7/2002 | Lopez et al. | |
| 6,539,336 B1 | 3/2003 | Vock et al. | |
| 6,611,138 B2 | 8/2003 | Vasiloiu | |
| 6,612,749 B2 | 9/2003 | Arnault et al. | |
| 6,666,784 B1 | 12/2003 | Iwamoto et al. | |
| 6,746,352 B1 | 6/2004 | Poiret et al. | |
| 6,817,457 B2 * | 11/2004 | Monahan et al. | 192/38 |
| 6,908,229 B2 | 6/2005 | Landrieve et al. | |
| 7,033,080 B2 | 4/2006 | Landrieve et al. | |
| 7,537,540 B2 * | 5/2009 | Baumann et al. | 475/263 |
| 2002/0148697 A1* | 10/2002 | Muramatsu et al. | 192/46 |
| 2003/0002764 A1 | 1/2003 | Pflugner et al. | |
| 2003/0007631 A1 | 1/2003 | Bolognesi et al. | |
| 2003/0051960 A1* | 3/2003 | Li et al. | 192/28 |
| 2004/0013334 A1 | 1/2004 | Landrieve et al. | |
| 2004/0065762 A1* | 4/2004 | Mori et al. | 242/371 |
| 2004/0141669 A1 | 7/2004 | Landrieve et al. | |
| 2004/0154895 A1 | 8/2004 | Thomire et al. | |
| 2004/0202392 A1 | 10/2004 | Niarfeix et al. | |
| 2005/0008276 A1 | 1/2005 | Beghini et al. | |
| 2005/0011717 A1 | 1/2005 | Arnault | |
| 2005/0011718 A1 | 1/2005 | Arnault | |
| 2005/0016812 A1* | 1/2005 | Kohler et al. | 192/45.1 |
| 2005/0089255 A1 | 4/2005 | Debrailly et al. | |
| 2005/0124447 A1 | 6/2005 | Message et al. | |
| 2005/0165397 A1 | 7/2005 | Faus et al. | |
| 2005/0235513 A1 | 10/2005 | Niarfeix | |
| 2005/0265646 A1 | 12/2005 | Arnault et al. | |
| 2006/0011445 A1 | 1/2006 | Bussit et al. | |
| 2006/0104558 A1 | 5/2006 | Gallion et al. | |

FOREIGN PATENT DOCUMENTS

| | | |
|---|---|---|
| DE | 4228899 | 3/1994 |
| DE | 9418459 | 2/1995 |
| DE | 29708535 | 8/1997 |
| DE | 19637585 | 3/1998 |
| DE | 19809074 | 1/1999 |
| DE | 10011820 | 9/2001 |
| DE | 10042677 | 3/2002 |
| DE | 10148388 | 4/2003 |
| EP | 399855 | 11/1990 |
| EP | 511105 | 10/1992 |
| EP | 520853 | 12/1992 |
| EP | 823267 | 2/1998 |
| EP | 930505 | 7/1999 |
| EP | 992797 | 4/2000 |
| EP | 1146244 | 10/2001 |
| FR | 2375484 | 12/1977 |
| FR | 2577291 | 8/1986 |
| FR | 2602872 | 2/1988 |
| FR | 2611244 | 8/1988 |
| FR | 2655735 | 6/1991 |
| FR | 2688560 | 9/1993 |
| FR | 2703450 | 10/1994 |
| FR | 2744506 | 8/1997 |
| FR | 2772444 | 6/1999 |
| FR | 2819864 | 7/2002 |
| GB | 2156082 | 10/1985 |
| JP | 10030693 | 2/1988 |
| JP | 09072394 | 3/1997 |
| JP | 20011289291 | 10/2001 |
| WO | 02052280 | 7/2002 |
| WO | 2004005937 | 1/2004 |

OTHER PUBLICATIONS

U.S. Appl. No. 10/562,476 entitled "Bearing Support With an Instrumented Movement and Coder for an Information Recorder Unit" to Gallion et al. Available in Private PAIR.

U.S. Appl. No. 10/551,167 entitled "Portable Measuring Device for Use in Sport" to Landrieve, available in Private PAIR.

International Preliminary Examination Report for PCT/FR04/000639.

International Search Report for PCT/FR04/000639.

International Preliminary Examination Report for PCT/FR02/00359 mailed Dec. 13, 2002 (6 pages).

Allan, Roger, "Coil-Based Micromachined Sensor Measures Speed and Position for Automotive Applications", Electronic Design, Penton Publishing, Cleveland, OH, US, vol. 44, No. 26, Dec. 16, 1996, pp. 34, 35, and 37.

International Search Report for PCT/FR04/000602.

International Search Report for PCT/FR02/00359 mailed Jul. 3, 2002.

French Search Report for FR 0302363 mailed Oct. 6, 2003.

International Search Report for PCT/FR 03/00264 mailed on May 28, 2003 (2 pages).

European Search Report for EP 04290379, research completed on May 19, 2004 (2 pages).

Preliminary Search Report for FR 0208263, completed on Mar. 27, 2003 (2 pages).

International Preliminary Examination Report for PCT/FR03/00264 mailed Jul. 28, 2003 (5 pages).

International Preliminary Examination Report for PCT/FR03/01985 mailed Dec. 9, 2004 (7 pages).

Rapport D'Examen Preliminaire International for PCT/FR05/02005, Date d'achevement du present rapport Oct. 3, 2005 (1 page).

Rapport D'Examen Preliminaire International for PCT/FR03/0312354, Date d'achevement du present rapport Apr. 21, 2004 (1 page).

* cited by examiner

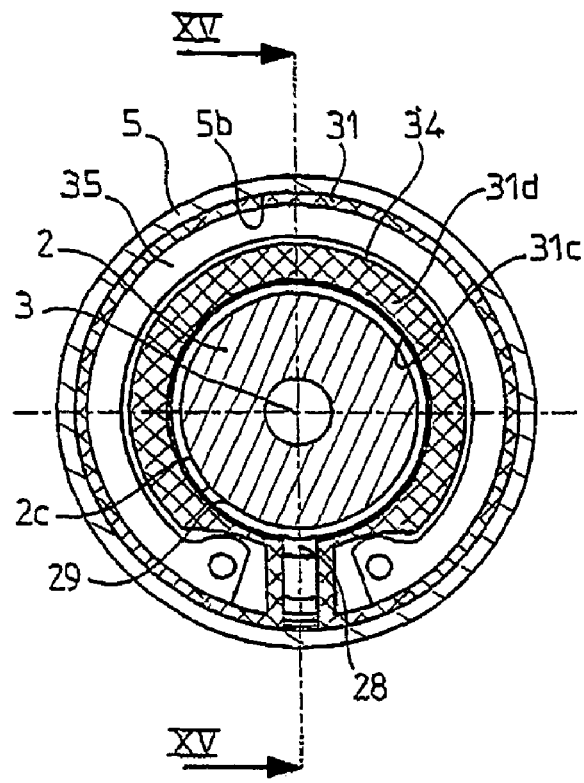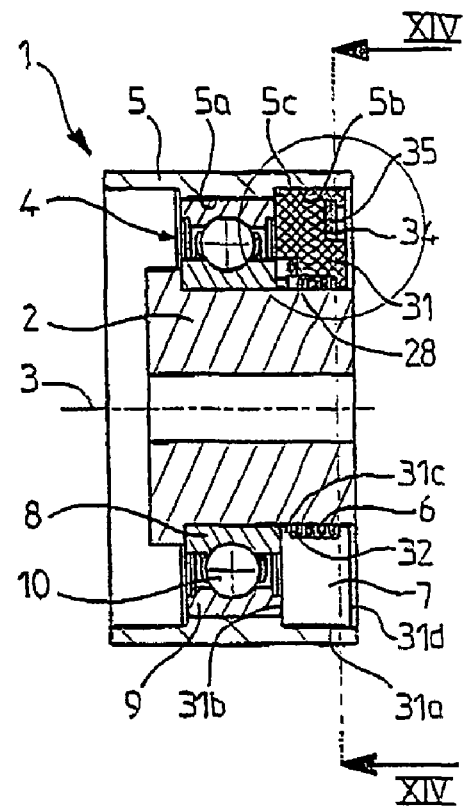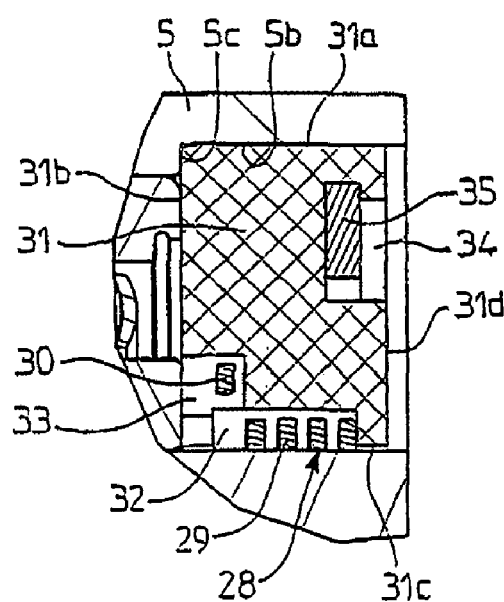

FREEWHEEL BEARING DEVICE WITH TORQUE LIMITER

BACKGROUND OF THE INVENTION

1. Field of the Invention

The present invention relates to the field of bearings comprising a unidirectional clutch or freewheel, usually interposed between an inner element and an outer element.

2. Description of the Relevant Art

The freewheel makes it possible to transmit a torque in one direction and to allow a relative rotation in the other direction. A bearing may also be interposed between the inner element and the outer element to support radial and, where necessary, axial loads. Document FR A 2 726 059 describes a device of this kind.

Also known is document GB-A-2 259 962 which describes a torque limiter making it possible to limit the torque to different values depending on the direction of rotation of one race relative to the other race, by means of friction balls in one direction and a spring in the other direction. However, this torque limiter is structurally and functionally different from a freewheel, because the free rotation of one race relative to the other race is not possible.

It would be beneficial to limit the torque transmitted by a freewheel when the freewheel is in a locked position, particularly to reduce the stresses sustained by other mobile elements, and reduce their fatigue. Document FR A 2 615 568 describes a freewheel starter drive comprising a torque limiter. Such a drive is however relatively bulky.

SUMMARY OF THE INVENTION

The freewheel bearing device described herein proposes to limit the torque transmitted by a freewheel in a simple and compact manner.

Described herein is a freewheel device with torque limiter that is easy to transport and handle and incorporate into a mechanical assembly.

The freewheel device, according to one embodiment, is of the type including an outer element, an inner element placed in the outer element, and a freewheel provided with at least one jamming element, placed between the inner element and the outer element to leave free a rotation movement in one direction between the outer element and the inner element and to transmit a torque in the other direction between the outer element and the inner element. The freewheel includes a race provided with an inner cylindrical surface and an outer cylindrical surface, substantially aligned on a radial plane perpendicular to the axis of rotation of the device, and a torque limiter member capable of limiting the torque transmitted by the freewheel, the torque limiter member being placed radially between said race and the outer element or the inner element in contact with said race and said element.

A slipping raceway may be formed on the inner cylindrical surface or the outer cylindrical surface, the torque limiter member being placed in contact with the outer cylindrical surface or the inner cylindrical surface respectively. The freewheel and the torque limiter member are thus linked in a manner requiring little space.

Any type of known freewheel with tilting cams, rollers, spring or pawl may be used.

In one embodiment, the torque limiter member is mounted in series with the freewheel to limit the torque transmitted by the unidirectional engagement member in the torque transmission position.

In one embodiment, the torque limiter member includes at least one friction element. The friction element may include a radial friction surface. The friction element may include an axial friction surface delimited by two radial planes.

In one embodiment, the device includes a bearing allowing the outer element to rotate relative to the inner element. The bearing may be a rolling bearing. Raceways for the rolling elements of said bearing are arranged in the inner and outer elements. Alternatively, the raceways are arranged in inner and outer races fixedly attached to the inner and outer elements.

In one embodiment, the torque limiter member is placed on an outer surface of the freewheel.

In another embodiment, the torque limiter member is placed in a bore of the freewheel.

In one embodiment, the torque limiter member includes an open elastic ring provided with an outer friction surface and an inner friction surface. The ring may be made of steel sheet and may have a U-channel provided with two axial flanges.

In one embodiment, the torque limiter member includes a plurality of elastic friction tongues.

In another embodiment, the torque limiter member includes an elastic ring made of synthetic material provided with an outer or inner friction surface and a respectively inner or outer attachment surface.

In one embodiment, the torque limiter member includes at least one friction ring and an elastic washer for placing the friction ring bearing axially on a friction surface. The torque limiter member may include two friction rings between which said elastic washer is mounted. The friction rings may have radial friction surfaces.

In one embodiment, the torque limiter member includes a body in the shape of an open ring. The race of the freewheel and the body of the torque limiter member may be a single element whose outer surface is in friction contact with the outer element in the case of angular rotation, and whose inner surface interacts with the jamming element, or whose inner surface is in friction contact with the inner element in the case of angular rotation, and whose outer surface interacts with the jamming element.

In one embodiment, the torque limiter member also includes an elastic element for prestressing said body. The elastic element may be a ring of the circlip type.

In one embodiment, the freewheel includes a spring provided with an end fixedly attached to the torque limiter member and coils in friction contact on the inner or outer element.

In one embodiment, the jamming elements of the freewheel are cams, rollers or pawls.

In one embodiment, the torque limiter member includes a friction element and an element for prestressing the friction element against said race and/or the outer element or the inner element. More particularly, the friction element may be prestressed between said race and the outer element, between said race and the inner element, between two surfaces fixedly attached to the outer element, or else between two surfaces fixedly attached to the inner element. The prestress element is advantageously a piece separate from the friction element.

In one embodiment, the torque limiter member is prestressed between two separate pieces in opposite directions. More particularly, the torque limiter member may be prestressed radially outward against the outer element and radially inward against said race, radially outward against said race and radially inward against the inner element, or axially against two opposite surfaces fixedly attached to the outer element or the inner element.

"Freewheel" as used herein refers to a device for transmitting a torque in one direction and a relative rotation in the other direction, with, where necessary, a negligible residual drag torque in normal operating conditions between an input element and an output element of the device.

Advantages of the freewheel bearing devices described herein include that the space requirement of the device is limited and it has the shape of a compact, preassembled cartridge relatively well protected against the outer elements. The lifetime of the moving parts upstream and downstream of the freewheel is lengthened thanks to the smoothing of the torque peaks, hence more economical running and a reduced risk of breakage.

BRIEF DESCRIPTION OF THE DRAWINGS

The invention will be better understood on studying the detailed description of several embodiments taken as nonlimiting examples and illustrated by the appended drawings in which:

FIG. 14 is a view in section along XIV-XIV of FIG. 15 of a freewheel device according to a sixth embodiment of the invention;

FIG. 15 is a view in section along XV-XV of FIG. 14; and

FIG. 16 is a detail view of FIG. 15.

Figure 1:
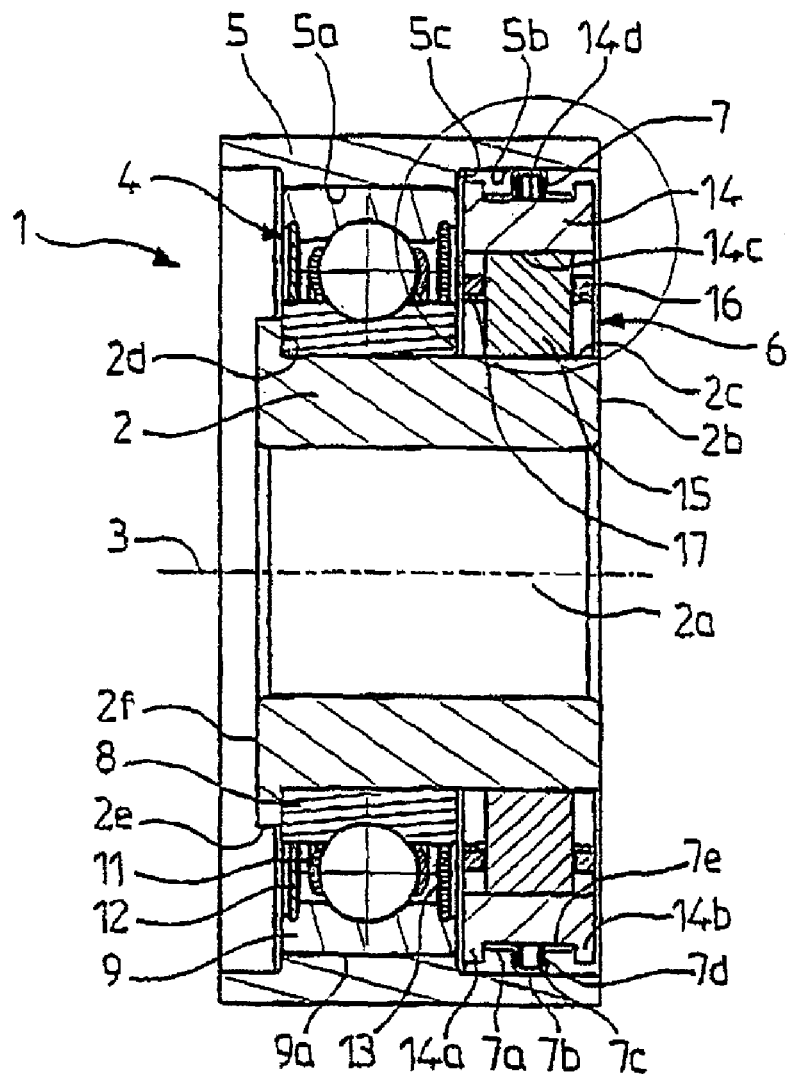
FIG. 1 is a view in axial section of a freewheel device according to a first embodiment of the invention.
Figure 2:
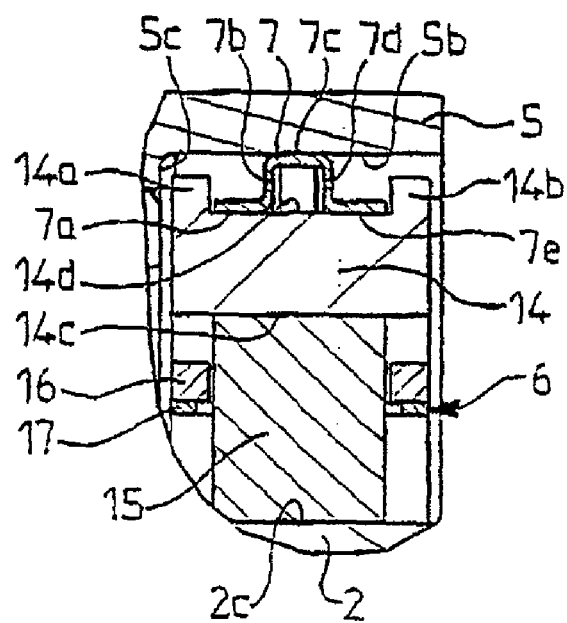
FIG. 2 is a detail view of FIG. 1.

While the invention is susceptible to various modifications and alternative forms, specific embodiments thereof are shown by way of example in the drawings and will herein be described in detail. It should be understood, however, that the drawing and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

As can be seen in FIGS. 1 to 4, the freewheel device, reference number 1 in its entirety, includes a tubular sleeve 2 with its axis 3, a rolling bearing 4 mounted on the sleeve 2, an outer element 5 mounted on the rolling bearing 4, a freewheel 6 mounted on the sleeve 2 and a friction element 7 mounted between the outer element 5 and the freewheel 6.

The sleeve 2 includes a bore 2a, a transverse radial surface 2b, an outer cylindrical surface 2c extending over the major part of its length from the end radial surface 2b, a radial surface 2d extending toward the outside from the end of the outer cylindrical surface 2c, a short axial surface 2e extending from the free end of the radial portion 2d, axially opposite the end radial surface 2b, and an end radial surface 2f opposite the end radial surface 2b.

The rolling bearing 4 may be of a standard type, with a low production cost and includes a solid inner race 8 provided with a bore mounted, for example by sleeve-fitting, onto the outer cylindrical surface 2c of the sleeve 2, and in contact with the radial portion 2d, a solid outer race 9, a row of rolling elements 10, here balls, placed between a raceway of the inner race 8 and a raceway of the outer race 9, a cage 11 for retaining the circumferential spacing of the rolling elements 10 and seals 12 and 13 fixedly attached to the outer race 9 and rubbing on a cylindrical bearing surface of the inner race 8, placed on one side and the other of the row of rolling elements 10 to prevent foreign elements from intruding close to the rolling elements 10 and to retain a lubricant such as grease inside the rolling bearing and close to the rolling elements 10. The outer race 9 is provided with an outer cylindrical surface 9a, coaxial with the outer cylindrical surface 2c of the sleeve 2.

The outer element 5 includes a central bore 5a mounted, for example by sleeve-fitting, onto the outer cylindrical surface 9a of the outer race 9. The rolling bearing 4 thus provides the freedom of rotation of the outer element 5 relative to the sleeve 2, and the acceptance of the radial forces. The outer element 5 also includes a bore 5b, with a diameter very slightly greater than the central bore 5a, and placed at the axial end of the outer element 5 situated opposite the support 4. The rolling bearing 4 and the outer element 5 are symmetrical relative to a radial plane passing through the center of the rolling elements 10. An annular radial surface 5c is formed between the bores 5a and 5b.

The freewheel 6, mounted adjacent to the rolling bearing 4, includes an outer race 14, for example of the solid type, whose bore forms a slipping raceway 14c, a row of jamming elements 15, here cams, a cage 16 provided with windows in which are placed the jamming elements 15 in the form of cams and a spring 17 for the return of the jamming elements 15 keeping said jamming elements in permanent contact with the raceways. The jamming elements 15 are placed radially between the outer cylindrical surface 2c of the sleeve 2, axially between the rolling bearing 4 and the end radial surface 2b of the sleeve 2, and the raceway 14c of the outer race 14.

Between the periphery of the outer race 14 and the bore 5b of the outer element 5, there is a radial space in which the friction element 7 is placed. More precisely, the outer race 14 includes two circular ribs 14a, 14b, directed radially outward. The ribs 14a and 14b are placed axially at the ends of the outer race 14 while being aligned with the end radial surfaces of the outer race 14 and surround an outer axial surface 14d of the outer race 14. The friction element 7 is placed between the ribs 14a and 14b and is thus fixedly attached axially to the outer race 14.

The friction element 7 has the shape of a ring open over a small angular sector, for example of the order of a few degrees. The friction element 7 is, in axial cross section, U-shaped with two axial flanges and may be made of rolled metal sheet. In other words, the friction element 7, in axial section, includes a small diameter axial portion 7a, a radial portion 7b extending outward from one end of the axial portion 7a, an axial portion 7c extending opposite the axial section 7a from the large diameter end of the radial portion 7b, a radial portion 7d extending inward from the free end of the axial portion 7c and an axial portion 7e extending opposite the axial portion 7a from the small diameter end of the radial portion 7b. The axial portions 7a and 7e have a substantially identical diameter and are in contact with the outer surface of the solid race 14, the free end of the axial portion 7a being placed close to the rib 14a and the free end of the axial portion 7e being placed close to the rib 14b. The friction element 7 is symmetrical relative to a radial plane passing through the middle of the axial portion 7c. The axial portion 7c is in contact with the bore 9b of the outer element 5. The friction element 7 may be provided with a local or general coating to improve its friction or anti-corrosion properties.

Figure 3:
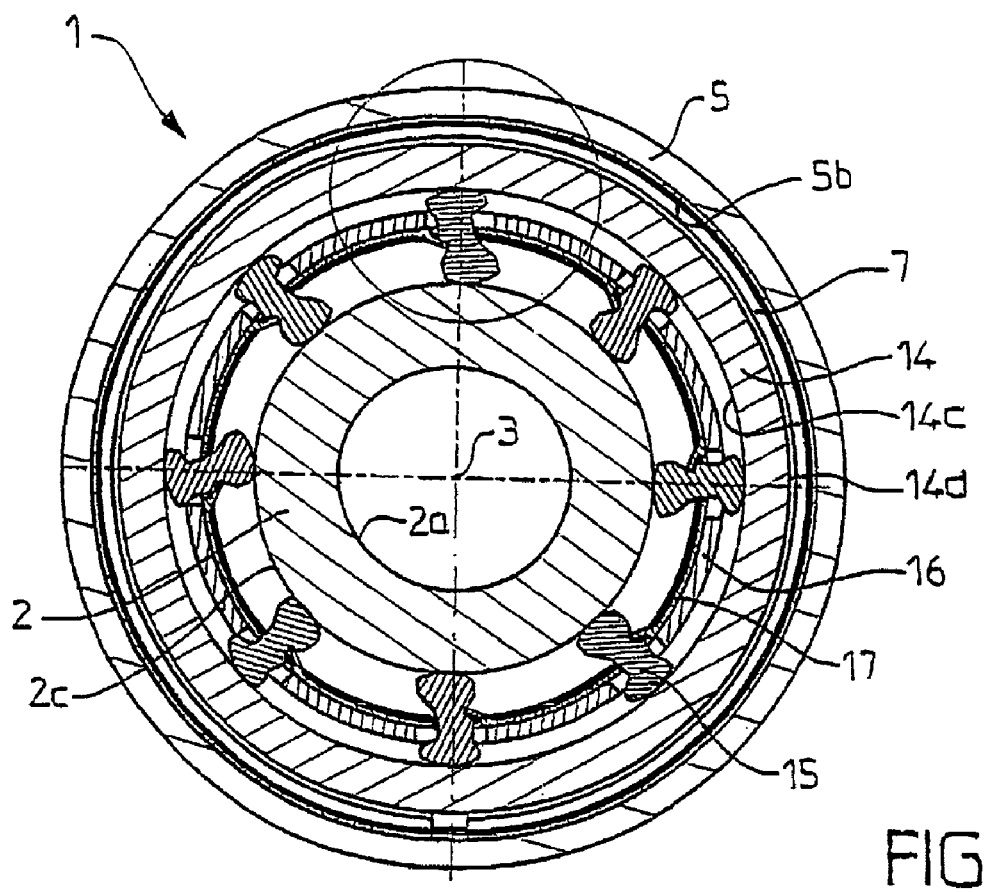
FIG. 3 is a view in cross section along a plane passing through the jamming elements of the device of FIG. 1.
Figure 4:
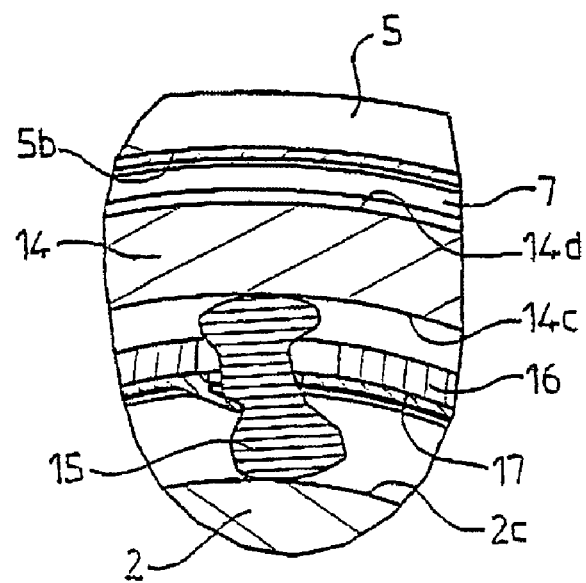
FIG. 4 is a detail view of FIG. 3.

The operation of the device will be better understood with reference to FIG. 3. When the outer element 5 rotates in the counterclockwise direction relative to the sleeve 2, the freewheel 6 is in the freewheeling position with the jamming elements 15 in the tilted position, rubbing on the outer cylindrical surface 2c of the sleeve 2 and/or on the raceway 14c of the outer race 14. The sleeve 2 is only subjected to the drag torque of the rolling bearing 4 and of the freewheel 6. The friction element 7 drives the outer race 14 at the same speed as the outer element 5.

When the outer element 5 rotates in the clockwise direction relative to the sleeve 2, the freewheel 6 is placed in the locking position, the jamming cams 15 pressing on the outer cylindrical surface 2c of the sleeve 2 and on the raceway 14c of the solid race 14. The sleeve 2 is therefore subjected to a torque that may be high and which tends to make it rotate in the clockwise direction. However, when the torque transmitted from the outer element 5 to the friction element 7, from the friction element 7 to the freewheel 6 and from the freewheel 6 to the sleeve 2, exceeds a predetermined threshold, the friction element 7 begins to slip, relative to the solid race 14 and/or relative to the outer element 5, and thus smoothes the torque peaks transmitted to the outer element 5. The predetermined torque threshold may be chosen on assembly and depends on the features of the friction element and of the surfaces with which said friction element is in contact.

By analogy with an electric system, the assembly formed by the freewheel 6 and the torque limiter friction element 7 may be seen as a Zener diode which allows free passage of the electric current in one direction and prevents it in the other until a certain voltage is reached, a voltage beyond which the current may again pass freely.

Thus, placing the friction element 7 and the freewheel 6 in series makes it possible, on the one hand, to allow a free rotation in one direction, and to prevent rotation in the opposite direction up to the limit of a maximum torque beyond which the rotation is again allowed with, in addition, losses through friction of the friction element 7 on the outer race 14 and on the bore 5b of the outer element 5.

Figure 5:
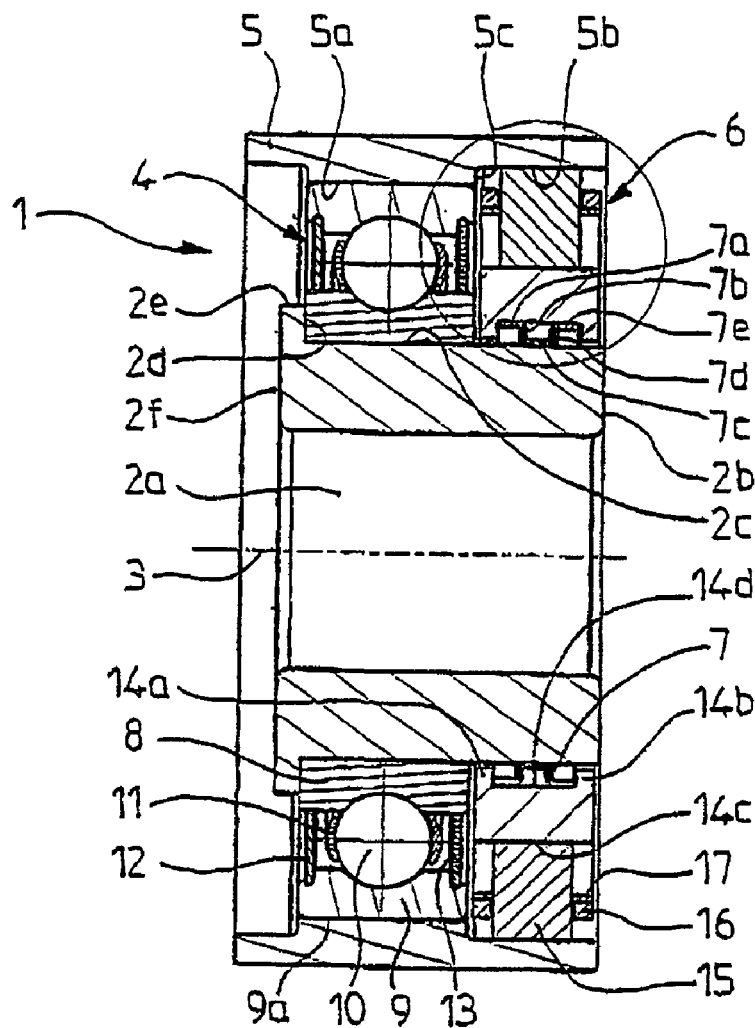
FIG. 5 is a view in axial section of a freewheel device according to a second embodiment of the invention.
Figure 6:
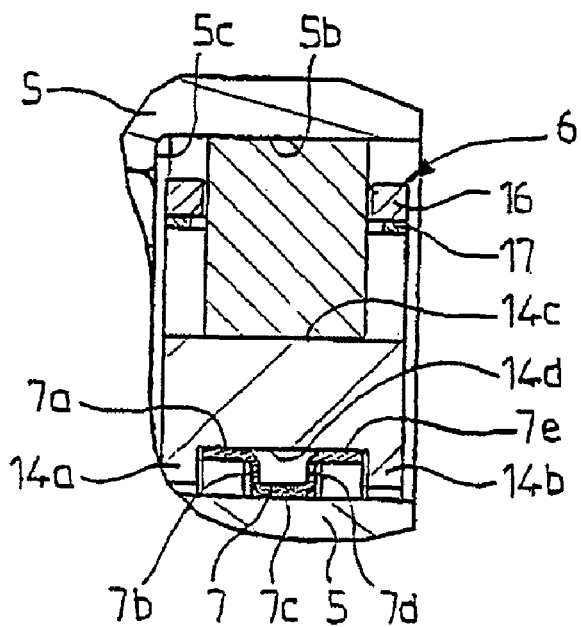
FIG. 6 is a detail view of FIG. 5.

The embodiment illustrated in FIGS. 5 and 6 is similar to the foregoing embodiments, except that the relative dispositions of the freewheel 6 and the friction element 7 are inverted, the friction element 7 is placed between the outer cylindrical surface 2c of the sleeve 2 and the inner solid race 14 of the freewheel 6. The jamming elements 15 are placed between the raceway 14c formed on the outer cylindrical surface of the solid race 14 and the bore 5b of the outer element 5. The operation is similar, except that the freewheel 6, in the jamming position, is fixedly attached to the outer element 5 and can move angularly relative to the sleeve 2 by slipping of the friction element 7.

Figure 7:
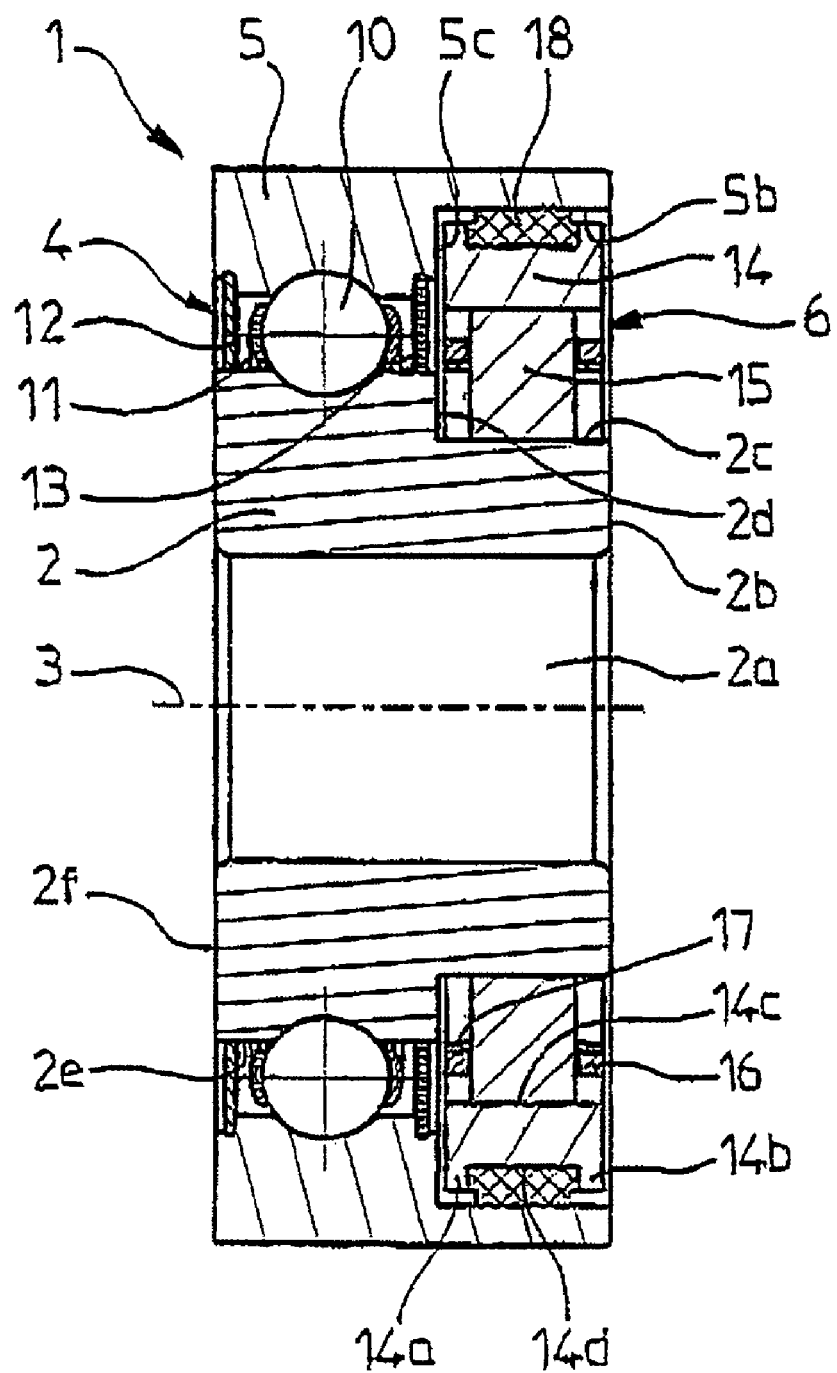
FIG. 7 is a view in axial section of a freewheel device according to a third embodiment.

The embodiment illustrated in FIG. 7 is comparable with that illustrated in FIGS. 1 to 4, except that the friction element 7 is replaced by a circumferentially continuous friction element 18 attached, for example by overmolding, to the outer race 14 of the freewheel 6 between the ribs 14a and 14b and radially protruding outward. The friction element 18 is made of synthetic material. The choice of the material and the radial prestress of the friction element 18 between the solid race 14 and the bore 5b of the outer element 5 determine the friction torque and therefore the maximum torque that can be transmitted between the outer element 5 and the sleeve 2. Raceways for the rolling elements 10 are made directly on the sleeve 2 and on the outer element 5, respectively from the surfaces 2e and 5a. The axial surface 2e has an axial length greater than the preceding embodiments. In other words, the rolling races are of a single piece with the sleeve 2 and the outer element 5 respectively.

Figure 8:
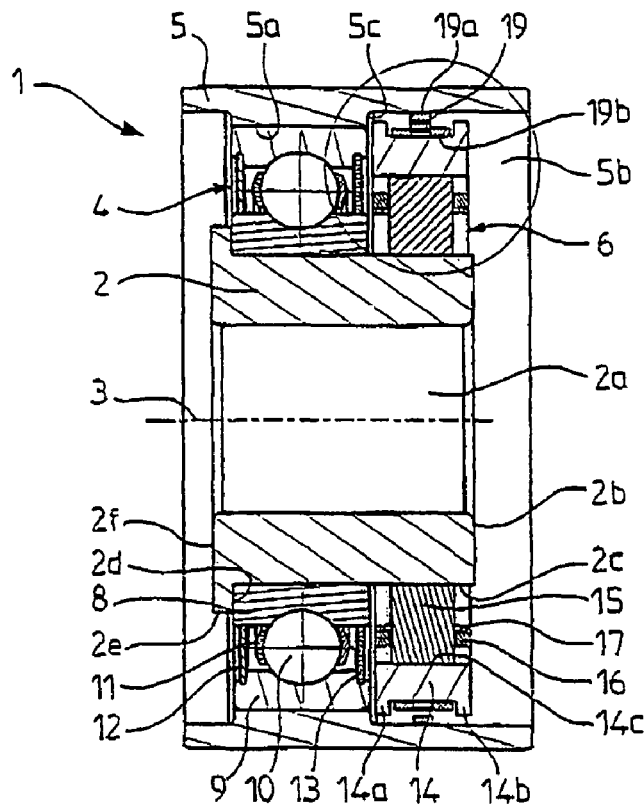
FIG. 8 is a view in axial section of a freewheel device according to a fourth embodiment of the invention.
Figure 9:
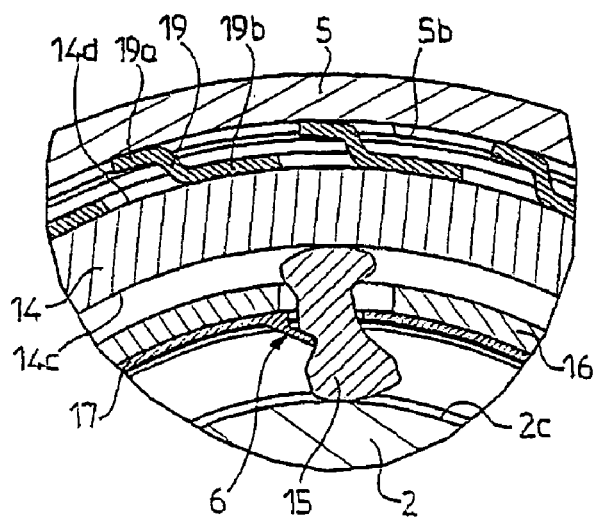
FIG. 9 is a detail view of the freewheel device of FIG. 8 taken in cross section along a plane passing through the jamming elements.
Figure 10:
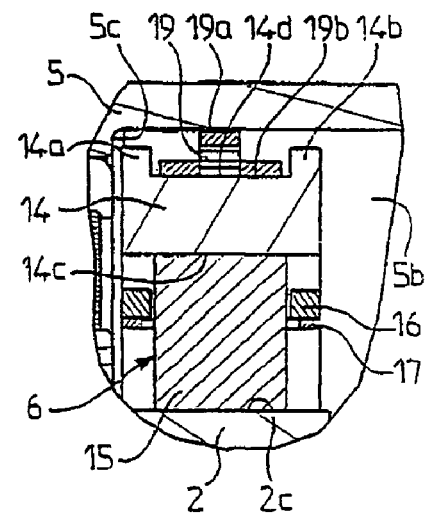
FIG. 10 is a detail view of FIG. 8.

The embodiment illustrated in FIGS. 8 to 10 is similar to that illustrated in FIGS. 1 to 4, except that the friction element 7 is replaced by a friction element 19 having the shape of a metal sheet ring comprising radially elastic tongues 19a originating from the body 19b of the ring. The ring may be circumferentially continuous or have the shape of a band cut to the correct length and rolled on itself with its two ends abutting. The body 19b of the friction element 19 is placed in contact with the solid race 14 between the ribs 14a and 14b, while the tongues 19a, protruding radially outward, are in contact with the bore 9b of the outer element 5.

Figure 11:
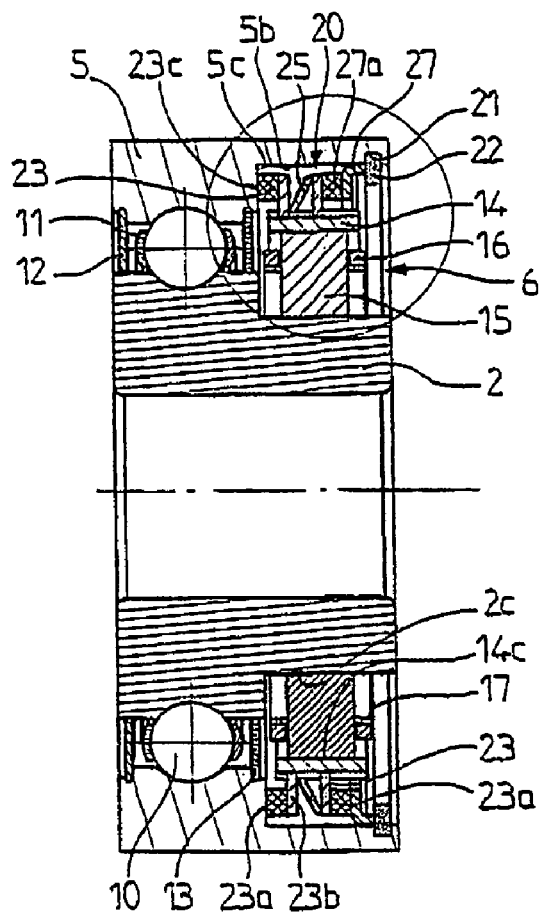
FIG. 11 is a view in axial section of a freewheel device according to a fifth embodiment of the invention.
Figure 12:
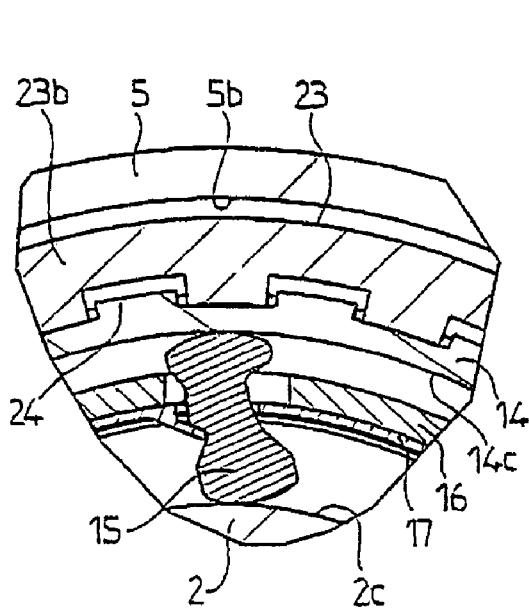
FIG. 12 is a detail view of the freewheel device of FIG. 11 taken in cross section along a plane passing through the jamming elements.
Figure 13:
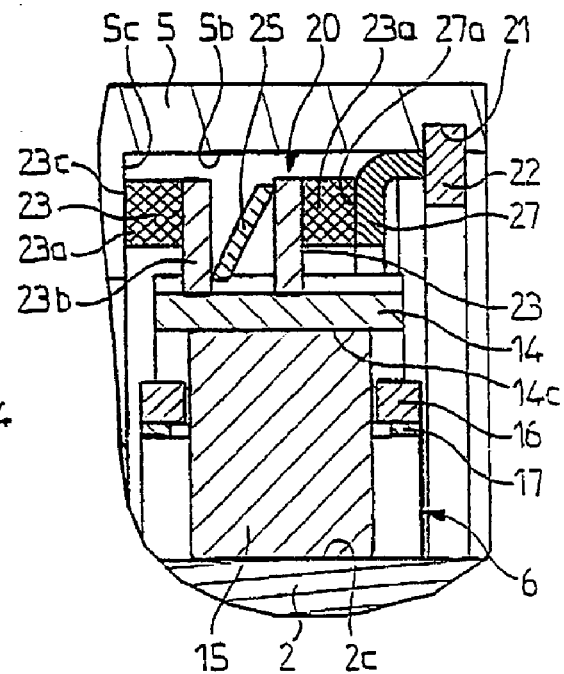
FIG. 13 is a detail view of FIG. 11.

In the embodiment illustrated in FIGS. 11 and 12, the friction element 7 is replaced by an axial-action friction device 20. The solid race 14 of the freewheel 6 has a reduced radial thickness to leave a greater space to the torque limiter device 20 and is provided with an axial outer surface. In addition, a groove 21 is formed in the bore 5b of the outer element 5 so that a circlip 22 can be housed therein, close to the free end of the bore 5b.

The torque limiter device 20 which surrounds the solid race 14 includes two friction rings 23 comprising a friction portion 23a made of synthetic material and a support portion 23b, for example in the shape of a flat metal washer. The friction portions 23a are fixedly attached to the support portion 23b for example by bonding or overmolding. The friction rings 23 are fixedly attached in rotation to the outer race 14 of the freewheel 6 by means such as axial splines 24 interacting with the bore of the support portions 23b of matching shape. The friction rings 23 may move axially relative to the solid race 14. Between the two friction rings 23 is placed an axial-action washer 25, of the Belleville washer type or else of the corrugated type. The torque limiter device 20 also includes a ring 27 in the shape of an L-section dish, sleeve-fitted into the bore 5b of the outer element 5 and axially in abutment contact against the circlip 22 placed in the groove 21. The ring 27 includes a radial friction surface 27a.

The friction portions 23a of the friction rings 23 have radial friction surfaces 23c, one in contact with the ring 27, and the other in contact with a radial surface 5c of the outer element 5 forming a shoulder between the bores 5a and 5b. The friction rings 23 are therefore pressing elastically against the corresponding friction surfaces of the outer element 5 and of the ring 27 fixedly attached to the outer element 5. The choice of the material of the friction rings 23 and of the axial prestress of the rings by the washer 25 determines the friction torque and the maximum transmissible torque threshold. Naturally, a variant could be provided comprising two washers 25 or else a single ring 23 and a single washer 25.

The embodiment illustrated in FIGS. 14 to 16 is close to that illustrated in FIGS. 1 to 4, except that the freewheel 6 includes a spring 28 provided with coils 29 in contact with the outer surface 2c of the sleeve 2 and with one end 30 protruding outward. The friction element 7 includes a body 31 in the shape of an open ring made of synthetic material and provided with an axial outer surface 31a in contact with the bore 5b of the outer element 5, a radial surface 31b connecting to the axial surface 31a, directed inward and in contact with the shoulder 5c of the outer element 5 and with a transverse radial surface of the outer race 9 of the rolling bearing 4, an axial bore surface 31c adjusted on the outer surface 2c of the sleeve 2 and a radial surface 31d placed opposite the radial surface 31b and joining the inner axial surface 31c and outer axial surface 31a. Seen in cross section, the body 31 has a generally rectangular shape.

However, in the inner axial surface 31c, an annular housing 32 is made, placed substantially in the center of the body 31 in the axial direction. Also, a notch 33 occupying a small angular sector is made between the housing 32 and the radial surface 31b in contact with the rolling bearing 4. The notch 33 opens onto a transverse radial surface of the inner race 8 of the rolling bearing 4. The coils 29 of the spring 28 are housed in the annular housing 32 while the outward protruding end 30 is housed in the notch 33.

Thus, one of the free ends of the spring 28 is fixedly attached in rotation to the body 31 while the coils 29 are in friction contact on the outer axial surface 2c of the sleeve 2. The result is that, in one direction of relative rotation between the sleeve 2 and the body 31, the spring tends to tighten and angularly connects said sleeve 2 and said body 31. On the other hand, in the opposite direction of relative rotation, the coils 29 tend to loosen. The sleeve 2 and the body 31 may rotate freely relative to one another in said direction of relative rotation with a slight friction of the coils 29 on the outer axial surface 2c of the sleeve 2.

The body 31 also includes another annular groove 34 made from the radial surface 31d placed opposite the rolling bearing 4 and having a bottom slightly more extended radially than the entrance of said groove 34. A circlip 35 is placed in the bottom of the groove 34 while being temporarily radially restricted when it is mounted. The groove 34 is dimensioned so that, when the circlip 35 is in place in the bottom of the groove 34, said circlip 35 exerts on the body 31 a radially outward force. The body 31 being radially deformable due to the material used and due to said body 31 being an open ring, the outer surface 31a of the body 31 is prestressed radially on the bore 5b of the outer element 5 which ensures that the body 31 is fixedly attached to the outer element 5 up to a certain torque which may be determined by the dimensions of the outer element 5, the body 31 and the circlip 35 and by their component materials.

In other words, the body 31 forms a single element forming part of both the freewheel 6 and the friction element 7. Specifically, the annular housing 32 and the notch 33 interact with the spring 28, and the outer axial surface 31a is in contact with the bore 5b of the outer element 5 with the possibility of slipping angularly relative to said bore 5b in the event of excess torque.

Thus, in torque take-up operation, beyond a certain torque value, the body 31 of the friction element 7 begins to rotate relative to the outer element 5, thus limiting the transmitted torque to the predetermined value.

The illustrated embodiments relate to freewheels whose jamming elements are cams or a spring. Naturally the invention could also operate with a freewheel whose jamming element or elements are one or more pawls interacting with a serrated raceway.

Thanks to the invention, the longevity of the freewheel and the mechanical members mounted upstream and downstream is increased by the filtering of the torque peaks by the friction member. The race of the freewheel interacts also with the friction member thus giving a particularly compact assembly that is easy to transport, handle and install in a mechanical assembly, for example between a cylindrical housing and a shaft.

Further modifications and alternative embodiments of various aspects of the invention may be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description to the invention. Changes may be made in the elements described herein without departing from the spirit and scope of the invention as described in the following claims. In addition, it is to be understood that features described herein independently may, in certain embodiments, be combined.

What is claimed is:

1. A freewheel bearing device comprising:
   an outer element;
   an inner element placed in the outer element;
   a rolling bearing; and
   a freewheel provided with at least one jamming element, the rolling bearing and the freewheel being mounted adjacent between the inner element and the outer element to leave free a rotation movement in one direction and to transmit a torque in the other direction between the outer element and the inner element;
      wherein the at least one jamming element is mounted between, and in contact with, one of the outer and inner elements, and a first cylindrical surface of a race of the freewheel, and wherein the jamming elements of the freewheel are cams, rollers or pawls; and
   a torque limiter member capable of limiting the torque transmitted by the freewheel, the torque limiter member being placed radially on a second cylindrical surface of the race of the freewheel, between the race and the other one of the outer and inner elements with which the at least one jamming element is not in contact.

2. The device as claimed in claim 1, wherein the torque limiter member is mounted in series with the freewheel to limit the torque transmitted by the unidirectional engagement member in the torque transmission position.

3. The device as claimed in claim 1, wherein raceways for the rolling elements of the bearing are arranged in the inner and outer elements.

4. The device as claimed in claim 1, wherein the second cylindrical surface comprises two annular ribs, the torque limiter being placed between the ribs.

5. The device as claimed in claim 1, wherein the freewheel comprises a spring provided with an end fixedly attached to the torque limiter member and coils in friction contact on the inner or outer element.

6. The device as claimed in claim 1, wherein the torque limiter member comprises a friction element and an element for prestressing the friction element against the race and/or the outer element or the inner element.

7. The device as claimed in claim 1, wherein the torque limiter member is prestressed between two separate pieces.

8. The device as claimed in claim 1, wherein the torque limiter member comprises at least one friction element.

9. The device as claimed in claim 8, wherein the friction element comprises a radial friction surface.

10. The device as claimed in claim 8, wherein the friction element comprises an axial friction surface delimited by two radial planes.

11. A freewheel bearing device comprising:
an outer element;
an inner element placed in the outer element;
a rolling bearing; and
a freewheel provided with at least one jamming element, the rolling bearing and the freewheel being mounted adjacent between the inner element and the outer element to leave free a rotation movement in one direction and to transmit a torque in the other direction between the outer element and the inner element;
wherein the at least one jamming element is mounted between, and in contact with, one of the outer and inner elements, and a first cylindrical surface of a race of the freewheel; and
a torque limiter member capable of limiting the torque transmitted by the freewheel, the torque limiter member being placed radially on a second cylindrical surface of the race of the freewheel, between the race and the other one of the outer and inner elements with which the at least one jamming element is not in contact, wherein the torque limiter member comprises an open elastic ring provided with an outer friction surface and an inner friction surface.

12. The device as claimed in claim 11, wherein the open elastic ring is made of steel sheet and has a U-channel provided with two axial flanges.

13. A freewheel bearing device comprising:
an outer element;
an inner element placed in the outer element;
a rolling bearing; and
a freewheel provided with at least one jamming element, the rolling bearing and the freewheel being mounted adjacent between the inner element and the outer element to leave free a rotation movement in one direction and to transmit a torque in the other direction between the outer element and the inner element;
wherein the at least one jamming element is mounted between, and in contact with, one of the outer and inner elements, and a first cylindrical surface of a race of the freewheel; and
a torque limiter member capable of limiting the torque transmitted by the freewheel, the torque limiter member being placed radially on a second cylindrical surface of the race of the freewheel, between the race and the other one of the outer and inner elements with which the at least one jamming element is not in contact, wherein the torque limiter member comprises a plurality of elastic tongues.

14. A freewheel bearing device comprising:
an outer element;
an inner element placed in the outer element;
a rolling bearing; and
a freewheel provided with at least one jamming element, the rolling bearing and the freewheel being mounted adjacent between the inner element and the outer element to leave free a rotation movement in one direction and to transmit a torque in the other direction between the outer element and the inner element;
wherein the at least one jamming element is mounted between, and in contact with, one of the outer and inner elements, and a first cylindrical surface of a race of the freewheel; and
a torque limiter member capable of limiting the torque transmitted by the freewheel, the torque limiter member being placed radially on a second cylindrical surface of the race of the freewheel, between the race and the other one of the outer and inner elements with which the at least one jamming element is not in contact, wherein the torque limiter member comprises an elastic ring made of synthetic material provided with an outer or inner friction surface and a respectively inner or outer attachment surface.

15. A freewheel bearing device comprising:
an outer element;
an inner element placed in the outer element;
a rolling bearing; and
a freewheel provided with at least one jamming element, the rolling bearing and the freewheel being mounted adjacent between the inner element and the outer element to leave free a rotation movement in one direction and to transmit a torque in the other direction between the outer element and the inner element;
wherein the at least one jamming element is mounted between, and in contact with, one of the outer and inner elements, and a first cylindrical surface of a race of the freewheel; and
a torque limiter member capable of limiting the torque transmitted by the freewheel, the torque limiter member being placed radially on a second cylindrical surface of the race of the freewheel, between the race and the other one of the outer and inner elements with which the at least one jamming element is not in contact, wherein the torque limiter member comprises a body in the shape of an open ring.

16. The device as claimed in claim 15, wherein the torque limiter member further comprises an elastic element for prestressing the body.

* * * * *